(12) United States Patent
MacNeil et al.

(10) Patent No.: US 10,127,091 B1
(45) Date of Patent: Nov. 13, 2018

(54) INTERCEPTING SOCKET METADATA

(71) Applicant: Juniper Networks, Inc., Sunnyvale, CA (US)

(72) Inventors: Erin C. MacNeil, Carp (CA); Hariprasad Shanmugam, Kanata (CA); Sreekanth Rupavatharam, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 5 days.

(21) Appl. No.: 15/388,018

(22) Filed: Dec. 22, 2016

(51) Int. Cl.
*G06F 9/54* (2006.01)
(52) U.S. Cl.
CPC .................................. *G06F 9/545* (2013.01)
(58) Field of Classification Search
None
See application file for complete search history.

(56) References Cited

U.S. PATENT DOCUMENTS

| | | | |
|---|---|---|---|
| 2003/0145235 A1* | 7/2003 | Choo ....................... | G06F 9/468 713/167 |
| 2003/0172109 A1* | 9/2003 | Dalton ..................... | G06F 9/468 709/203 |
| 2009/0083455 A1* | 3/2009 | Sun ........................ | G06F 9/485 710/46 |
| 2009/0296685 A1* | 12/2009 | O'Shea ................... | H04L 69/32 370/351 |
| 2010/0138569 A1* | 6/2010 | Fuerst .................. | G06F 13/1663 710/36 |
| 2013/0055287 A1* | 2/2013 | Pope ....................... | G06F 9/546 719/314 |

OTHER PUBLICATIONS

Wikipedia, "Netfilter," http://en.wikipedia.org/wiki/Netfilter, Nov. 2, 2016, 7 pages.

* cited by examiner

*Primary Examiner* — Tuan C Dao
(74) *Attorney, Agent, or Firm* — Harrity & Harrity, LLP

(57) ABSTRACT

A device may receive, by a kernel of the device and from a loadable kernel module of the device, information that instructs the kernel to invoke a callback function associated with the loadable kernel module based on an execution of a hook of the kernel. The device may receive, by the kernel of the device and from an application of the device, a socket application programming interface (API) call. The socket API call may include control information. The device may execute, by the kernel of the device, the hook based on receiving the socket API call. The device may invoke, by the kernel of the device, the callback function associated with the loadable kernel module based on executing the hook to permit a functionality associated with the callback function to be provided. The kernel may provide the control information, associated with the socket API call, to the callback function as an argument.

20 Claims, 7 Drawing Sheets

INTERCEPTING SOCKET METADATA

BACKGROUND

In computer programming, the term hooking covers a range of techniques used to alter or augment the behavior of an operating system, of applications, or of other software modules by intercepting function calls, messages, and/or events passed between software modules. A hook may refer to code that handles such intercepted function calls, messages, or events.

SUMMARY

According to some possible implementations, a device may include one or more processors to receive, by a kernel of the device and from a loadable kernel module of the device, information that instructs the kernel to invoke a callback function associated with the loadable kernel module based on an execution of a hook of the kernel. The one or more processors may receive, by the kernel of the device and from an application of the device, a socket application programming interface (API) call. The socket API call may include control information. The one or more processors may execute, by the kernel of the device, the hook based on receiving the socket API call. The one or more processors may invoke, by the kernel of the device, the callback function associated with the loadable kernel module based on executing the hook to permit a functionality associated with the callback function to be provided. The kernel may provide the control information, associated with the socket API call, to the callback function as an argument.

According to some possible implementations, a non-transitory computer-readable medium may store one or more instructions that, when executed by one or more processors of a device, cause the one or more processors to receive, by a kernel of the device and from a loadable kernel module of the device, information that instructs the kernel to invoke a callback function associated with the loadable kernel module based on an execution of a hook of the kernel. The one or more instructions may cause the one or more processors to receive, by the kernel of the device and from an application of the device, a socket application programming interface (API) call. The one or more instructions may cause the one or more processors to execute, by the kernel of the device, the hook based on receiving the socket API call. The one or more instructions may cause the one or more processors to invoke, by the kernel of the device, the callback function associated with the loadable kernel module based on executing the hook to permit a functionality associated with the callback function to be provided. The kernel may provide control information, associated with the socket API call, to the callback function as an argument.

According to some possible implementations, a method may include receiving, by a kernel of a device and from a loadable kernel module of the device, information that instructs the kernel to invoke a function associated with the loadable kernel module based on an execution of a hook of the kernel. The hook may be associated with a network protocol stack of the kernel. The method may include receiving, by the kernel of the device and from an application of the device, a socket application programming interface (API) call. The socket API call including control information. The method may include executing, by the kernel of the device, the hook based on based on receiving the socket API call. The method may include invoking, by the kernel of the device, the function associated with the loadable kernel module based on executing the hook to permit a functionality associated with the function to be provided. The kernel may provide the control information, associated with the socket API call, to the function as an argument.

DETAILED DESCRIPTION

Figure 1A:
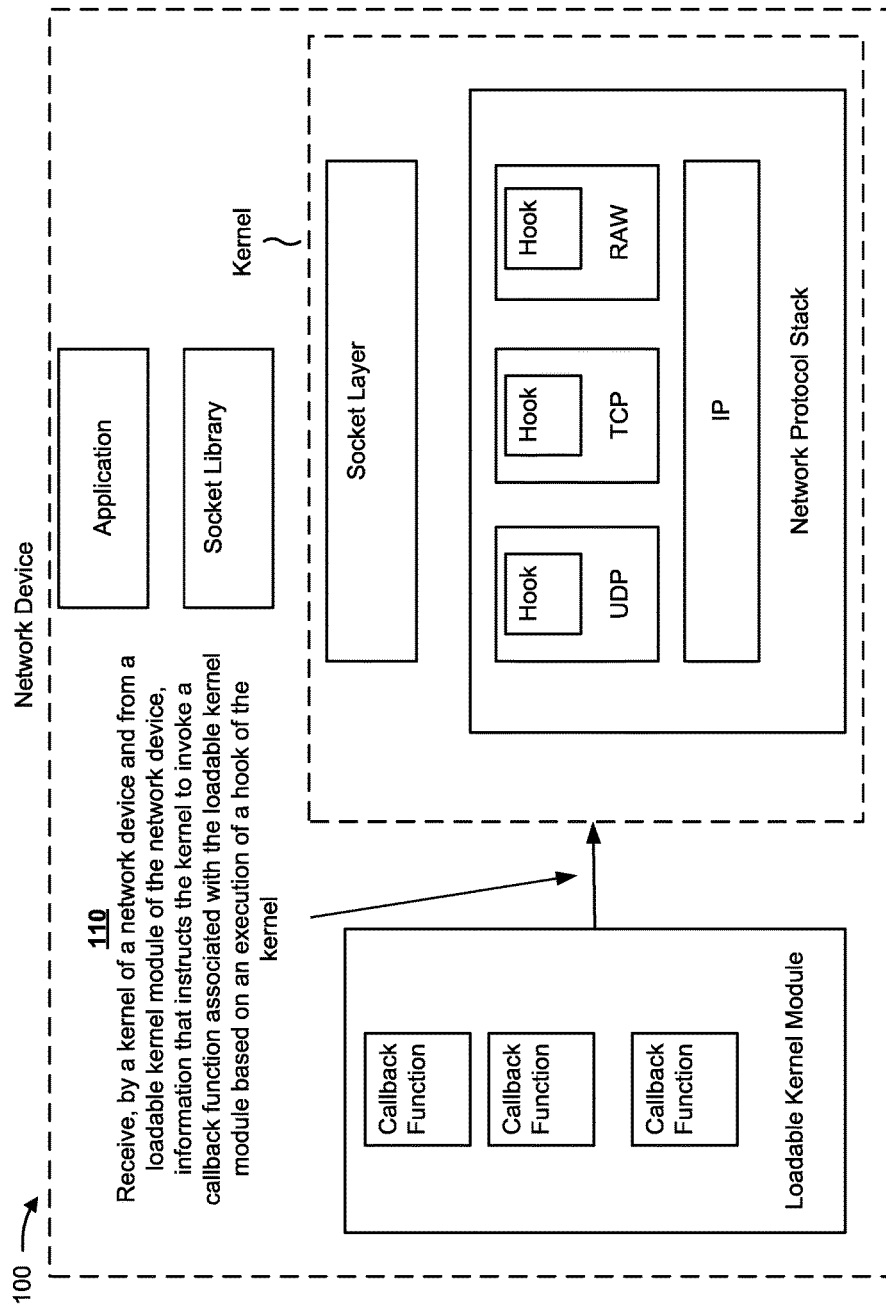
FIGS. 1A-1C are diagrams of an overview of an example implementation described herein.

The following detailed description of example implementations refers to the accompanying drawings. The same reference numbers in different drawings may identify the same or similar elements.

An application of a network device may transmit and receive network traffic (e.g., packets) via network sockets. A kernel of the network device may enable the application to utilize network sockets via a socket application programming interface (API). For example, the application may provide socket API calls to transmit network traffic to another socket, to receive network traffic from a socket, to manipulate options associated with a socket, or the like. In some cases, a socket API call may include payload information (e.g., data associated with the application) and/or control information (e.g., metadata, such as information that is utilized by a network protocol stack of the kernel or utilized by an application when processing the socket API call).

In some cases, interception of such control information and/or payload information may be desirable. For example, a network operator may desire to filter control information, monitor control information (e.g., for debugging purposes, for performance metric analysis, or the like), inject additional control information, or perform some other action in association with the control information. To do so, the kernel may require modification (e.g., extensive additions to operating system networking code), which may prove time intensive and/or error prone. Additionally, the desired functionality may change to support new types of control information, to support additional actions, or the like. In turn, iterative changes to the underlying operating system network code may be required.

Implementations described herein enable control information to be intercepted via usage of loadable kernel modules (e.g., code that extends the functionality of a kernel). For example, a loadable kernel module may register a callback function with the kernel, which may instruct the kernel to invoke the callback function based on a particular event. As an example, the event may include execution of a hook associated with a protocol specific handler of the kernel (e.g., code that may process particular types of socket API calls associated with various transport layer protocols). In this way, the kernel may receive, from an application, a socket API call that includes control information, and invoke a callback function associated with the loadable kernel module based on the socket API call.

Additionally, the kernel may provide the control information as an argument to the callback function, thereby enabling a functionality, associated with the callback function, to be performed in association with the control information (e.g., filter the control information, collect statistics associated with the control information, modify the control information, add additional control information, or the like). Additionally, the callback function may provide an execution result to the kernel, thereby enabling the kernel to further process the socket API call (e.g., provide a packet for transmission via a socket, provide a packet to the application, provide modified control information to the application, or the like).

In this way, implementations described herein enable extensibility to the kernel of the network device via loadable kernel modules rather than requiring modifications to underlying operating system network code. Additionally, implementations described herein enable interception of control information passed between an application and a kernel to support additional functionality provided via callback functions of a loadable kernel module.

Figure 1B:
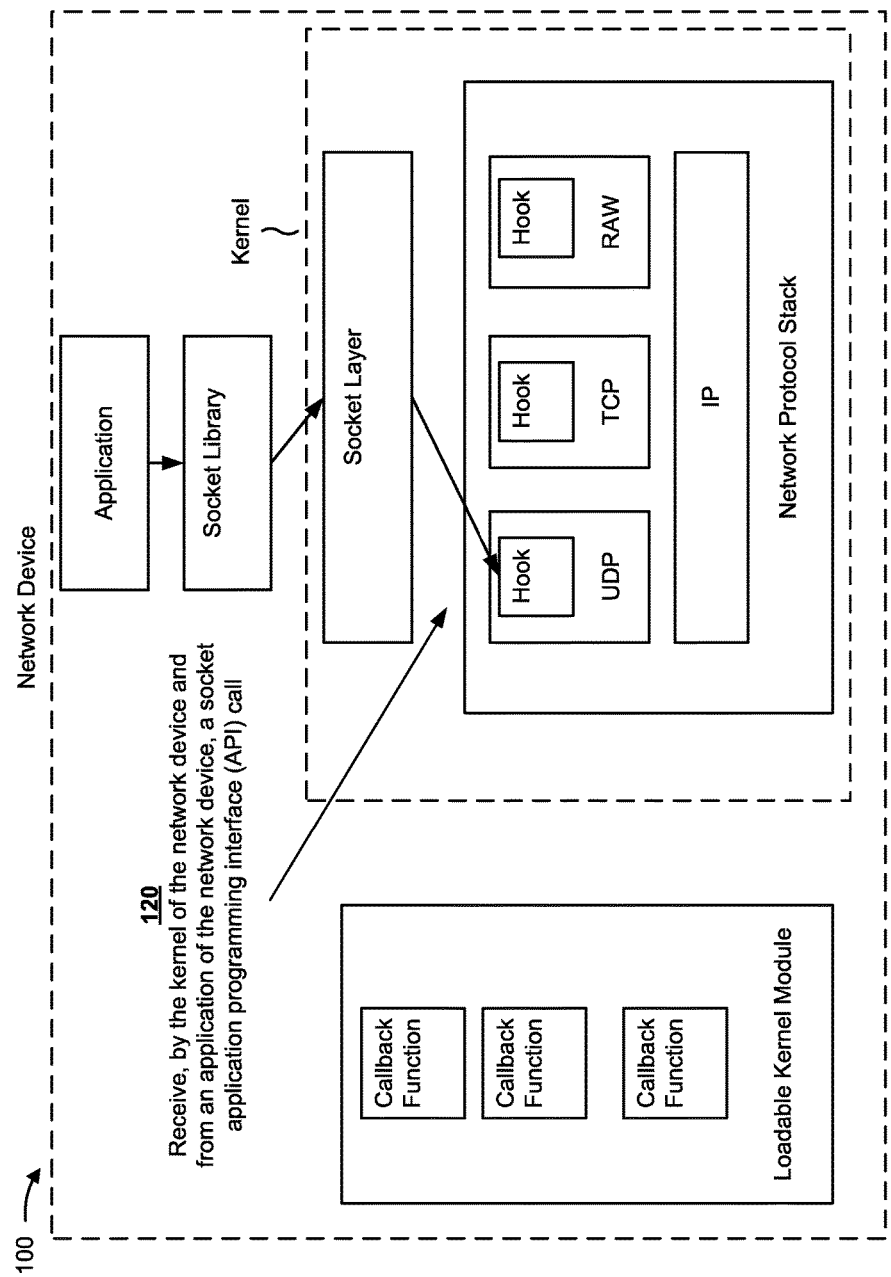
Figure 1C:
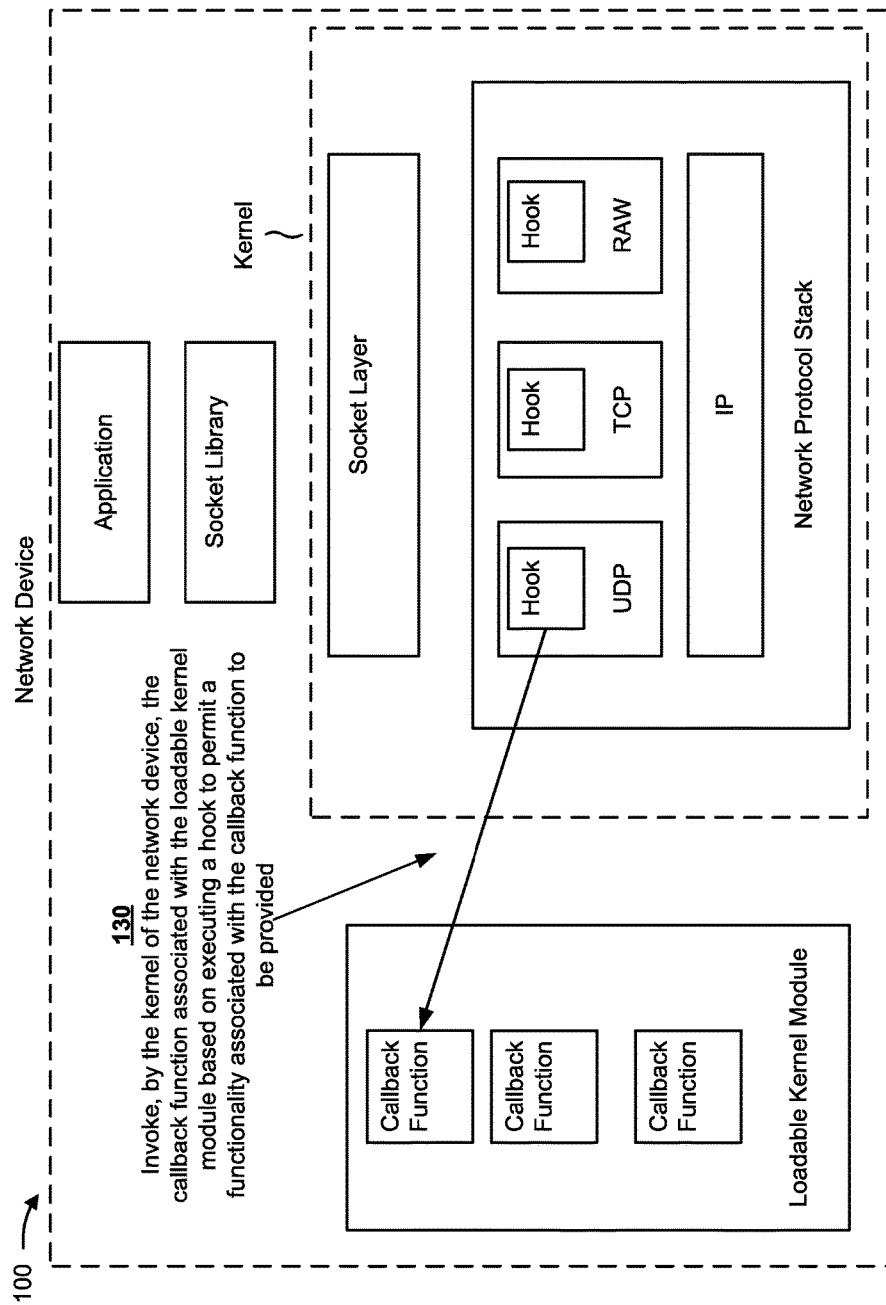

FIGS. 1A-1C are diagrams of an overview of an example implementation 100 described herein. As shown in FIGS. 1A-1C, example implementation 100 may include a network device that includes a kernel, an application, a socket library, and a loadable kernel module that includes one or more callback functions. Additional details regarding the kernel, application, socket library, and loadable kernel module are provided in connection with FIG. 4.

The kernel may include a socket layer and a network protocol stack that includes a network layer protocol handler (e.g., an Internet Protocol (IP) handler), and transport layer protocol handlers (e.g., a user datagram protocol (UDP) handler, a transmission control protocol (TCP) handler, a raw IP handler, etc.). Each handler may be associated with a hook, or a set of hooks, for intercepting socket API calls and invoking one of the one or more callback functions.

As shown in FIG. 1A, and by reference number 110, the kernel of the network device may receive, from a loadable kernel module of the network device, information that instructs the kernel to invoke a callback function associated with the loadable kernel module based on an execution of a hook of the kernel. In this case, the loadable kernel module may provide information to the kernel that instructs the kernel to invoke a callback function based on an occurrence of an event.

As an example, the event may include the kernel executing a hook associated with the network protocol stack. In this way, when a hook of the network protocol stack is executed, the kernel may invoke a callback function associated with the loadable kernel module. As a particular example, the event may be associated with the execution of a hook associated with a UDP handler. In this case, the hook may be associated with a UDP handler that processes socket API calls associated with transmitting packets via UDP sockets (e.g., sendmsg ( ) socket API calls).

As shown in FIG. 1B, and by reference number 120, the kernel of the network device may receive, from an application of the network device, a socket API call. In some implementations, the application may implement socket API calls to control and use sockets. In some implementations, the socket API call may include a socket API call used to transmit a packet to another socket (e.g., sendmsg ( ), send ( ), sendto ( ), or the like). In this case, the application may provide a socket API call used to transmit a packet, via UDP, to another UDP socket (e.g., associated with another network device).

In this case, a UDP handler associated with processing sendmsg ( ) socket API calls may receive the socket API call. Additionally, the UDP handler may allocate a socket buffer to store payload information associated with the socket API call (e.g., application data that may be transmitted via the UDP socket). Additionally, the UDP handler may receive control information associated with the socket API call. As used herein, control information may include information that is passed between an application and an operating system in association with socket API calls, that is ancillary to payload information (e.g., metadata), and that may be used by the network protocol stack when processing socket API calls and/or may be used by an application.

As shown in FIG. 1C, and by reference number 130, the kernel may invoke the callback function associated with the loadable kernel module based on executing a hook to permit a functionality associated with the callback function to be provided. In some implementations, the network protocol stack may be associated with a hook. For example, a hook may include code that intercepts a socket API call (e.g., intercepts a socket API call that is being provided to the kernel), intercepts control information (e.g., that is being passed from the kernel to the application, that is being passed from the application to the kernel, or the like). Additionally, the UDP handler may execute a hook associated with the UDP handler. In this case, the hook may intercept the payload information and/or the control information associated with the socket API call, invoke a callback function associated with the loadable kernel module, and provide the payload information and/or control information as arguments to the callback function.

Continuing with the example, the callback function may perform a particular functionality based on executing the callback function, and may provide an execution result to the UDP handler. For example, assume that the callback function modifies the control information. In this case, the UDP handler may receive the modified control information, and process the socket API call based on the modified control information. Additionally, the UDP handler may provide the payload information (e.g., including a UDP header, or the like) to a UDP socket for transmission based on processing the modified control information.

In this way, a hook may intercept control information (e.g., socket metadata) as the control information is being provided to a transport layer protocol specific handler of a network protocol stack, and provide the control information as an argument to a callback function of a loadable kernel module. The callback function may perform an action in association with the control information (e.g., filter the control information, modify the control information, add additional control information, etc.), and provide the control information (e.g., that has been filtered, modified, etc.) to the transport layer protocol specific handler for processing. The transport layer protocol specific handler may then process the control information (e.g., to transmit a packet to another socket, to manipulate an option associated with a socket, or the like). In this way, extensibility of the kernel may be achieved via loadable kernel modules rather than modification to code of the kernel.

As indicated above, FIGS. 1A-1C are provided merely as an example. Other examples are possible and may differ from what was described with regard to FIGS. 1A-1C.

Figure 2:
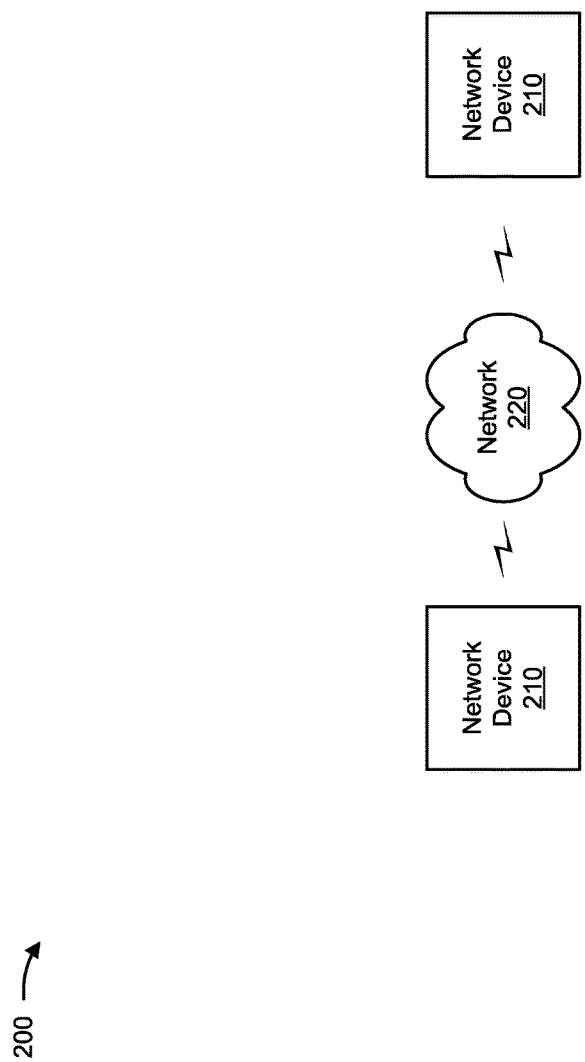
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include network devices 210 and a network 220. Devices of environment 200 may interconnect via wired connections, wireless connections, or a combination of wired and wireless connections.

Network device 210 includes a device (e.g., a traffic transfer device) capable of processing and transferring network traffic via socket. For example, network device 210 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device.

Network 220 includes one or more wired and/or wireless networks. For example, network 220 may include a cellular network (e.g., a fifth generation (5G) network, a long-term evolution (LTE) network, a code division multiple access (CDMA) network, a third generation (3G) network, another type of advanced generated network, etc.), a public land mobile network (PLMN), a local area network (LAN), a WAN, a MAN, a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
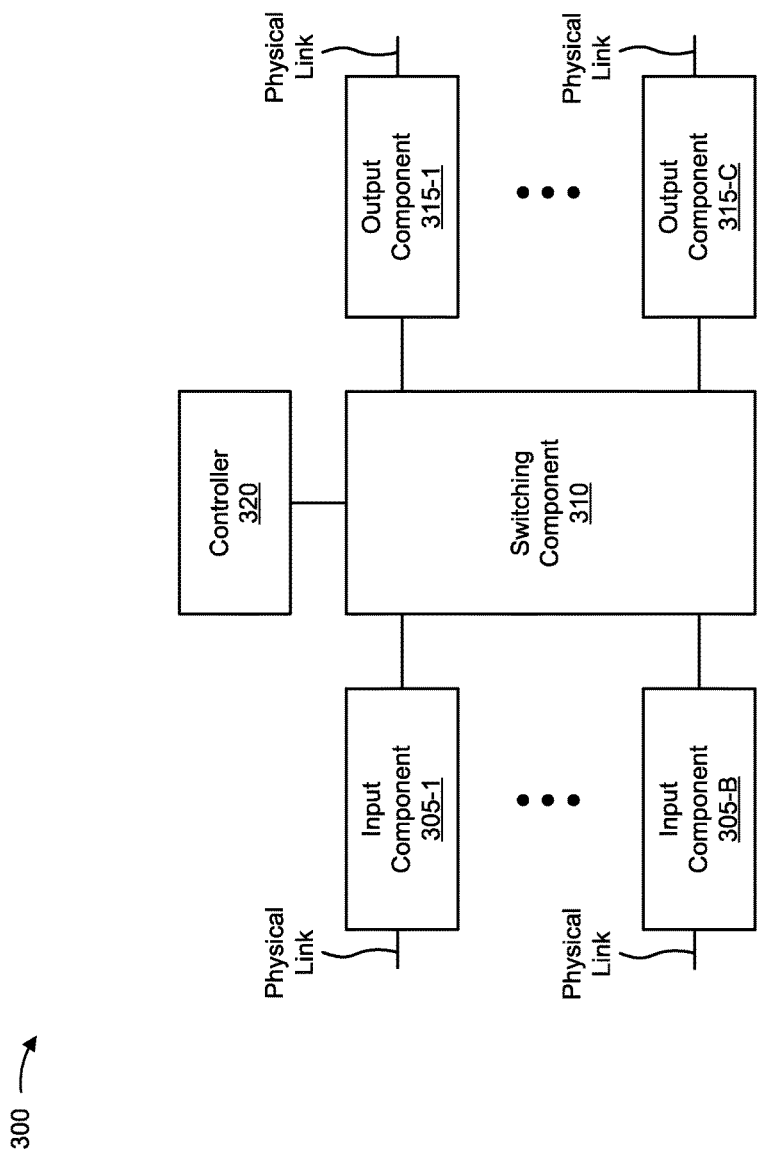
FIG. 3 is a diagram of example components of one or more devices of FIG. 2.

FIG. 3 is a diagram of example components of a device 300. Device 300 may correspond to network device 210. In some implementations, network device 210 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
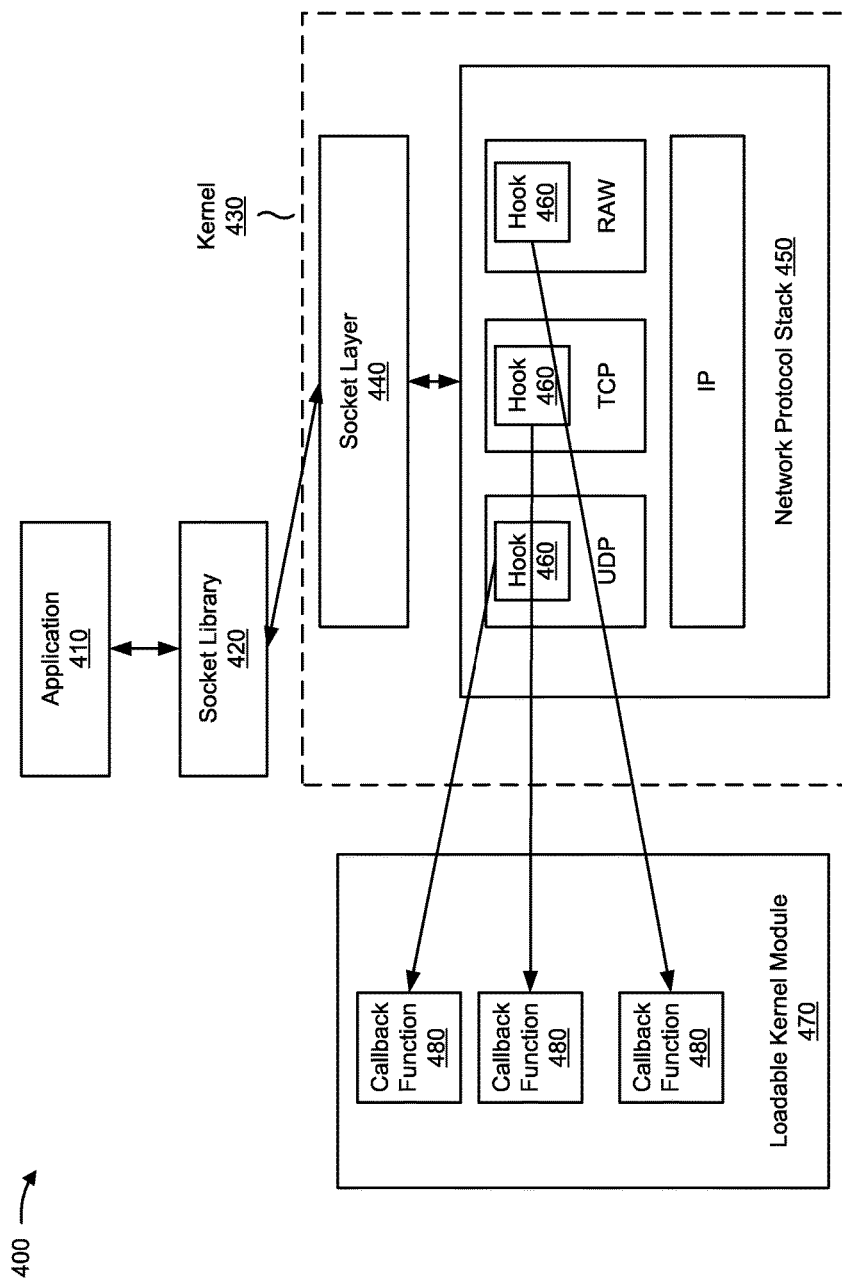
FIG. 4 is a diagram of example functional modules of one or more devices of FIG. 2.

FIG. 4 is a diagram of example functional modules of a device 400. Device 400 may correspond to network device 210. In some implementations, network device 210 may include one or more devices 400 and/or one or more functional modules of device 400. As shown in FIG. 4, device 400 may include one or more functional modules, such as application 410, socket library 420, kernel 430, socket layer 440, network protocol stack 450, hook 460, loadable kernel module 470, and callback function 480. Each of these functional modules may be implemented by one or more processors (e.g., in hardware, firmware, or software executing on hardware).

Application 410 includes a module that may be executed by network device 210 in association with a user space (e.g., a memory in which application software executes). Application 410 may transmit and receive packets via sockets of network device 210. As used herein, a packet may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

In some implementations, a socket may refer to an endpoint of a connection in a network. A socket may be associated with an IP address, a port address, or the like. Additionally, a socket may be associated with a particular transport layer protocol (e.g., TCP, UDP, raw IP, or the like).

Socket library 420 includes a module that may provide an API (e.g., a socket API) to application 410 that enables application 410 to interact with kernel 430 of network device 210 (e.g., socket layer 440, network protocol stack 450, etc.). For example, socket library 420 may enable application 410 to provide socket API calls to socket layer 440 to transmit packets via a socket, receive packets via a socket, manipulate options associated with a socket, or the like.

Kernel 430 includes a module that may execute in a kernel space (e.g., a memory reserved for execution of kernel 430) and process input/output requests (e.g., socket API calls) from application 410. In some implementations, kernel 430 may include socket layer 440, network protocol stack 450, and hook 460.

Socket layer 440 includes a module that may receive socket API calls from application 410 and invoke a protocol specific handler associated with network protocol stack 450. For example, a handler may refer to code associated with network protocol stack 450 that processes socket API calls for a particular networking protocol.

Network protocol stack 450 includes a module that may execute networking protocols, such as transport layer protocols (e.g., TCP, UDP, raw IP, etc.), network layer protocols (e.g., IP), or the like. In some implementations, network protocol stack 450 (e.g., a protocol specific handler) may receive a socket API call from socket layer 440, and may process the socket API call.

Hook 460 includes a module that may intercept a call, an event, a message, or the like. For example, hook 460 may intercept a socket API call, and invoke callback function 480 based on intercepting the socket API call, as described elsewhere herein. In some implementations, hook 460 may be associated with a protocol specific handler. That is, a UDP handler may include a first hook, a TCP handler may include a second hook, or the like. Additionally, or alternatively, handlers for particular types of socket API calls may include particular hooks. In some implementations, hook 460 may be executed based on a handler, of network protocol stack 450, receiving a socket API call from socket layer 440, based on a handler receiving a packet to be provided to application 410, or the like.

Loadable kernel module 470 includes a module that may extend functionality associated with kernel 430 (e.g., code that enables extensibility of kernel 430). In some implementations, loadable kernel module 470 may include a set of one or more callback functions 480.

Callback function 480 includes a module that may be invoked by hook 460 (e.g., at a particular time, based on an event, or the like). For example, callback function 480 may include code that, when executed, provides a particular functionality. In some implementations, hook 460 may invoke callback function 480 by sending control information as an argument to callback function 480. Callback function 480 may execute the particular functionality in association with the control information and then provide the control information to hook 460, which may provide the control information to one or more modules of network protocol stack 450.

The number and arrangement of functional modules shown in FIG. 4 are provided as an example. In practice, device 400 may include additional functional modules, fewer functional modules, different functional modules, or differently arranged functional modules than those shown in FIG. 4. Additionally, or alternatively, a set of functional modules (e.g., one or more functional modules) of device 400 may perform one or more functions described as being performed by another set of functional modules of device 400.

Figure 5:
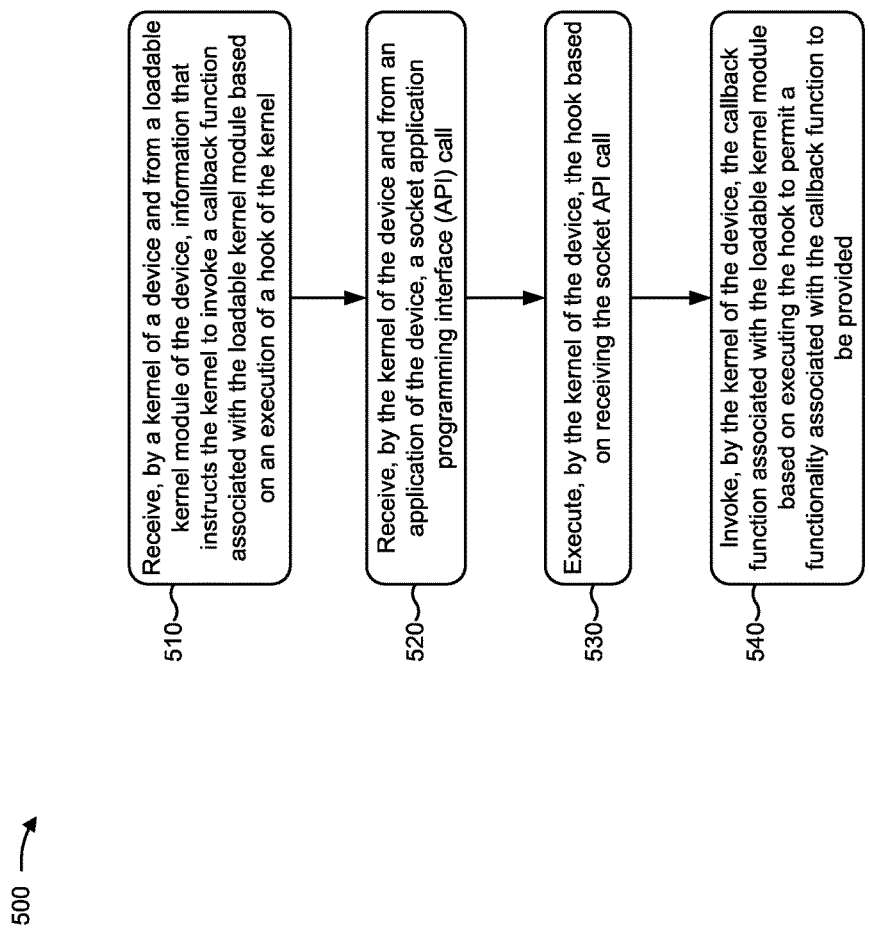
FIG. 5 is a flow chart of an example process for intercepting socket metadata.

FIG. 5 is a flow chart of an example process 500 for intercepting socket metadata. In some implementations, one or more process blocks of FIG. 5 may be performed by network device 210. In some implementations, one or more process blocks of FIG. 5 may be performed by kernel 430. In some implementations, one or more process blocks of FIG. 5 may be performed by another functional module of network device 210, such as loadable kernel module 470.

As shown in FIG. 5, process 500 may include receiving, by a kernel of a device and from a loadable kernel module of the device, information that instructs the kernel to invoke a callback function associated with the loadable kernel module based on an execution of a hook of the kernel (block 510). For example, kernel 430 may receive, from loadable kernel module 470, information that identifies a registration of callback function 480.

In some implementations, callback function 480 may include code that is passed as an argument (e.g., input) to other code (e.g., hook 460) that is expected to invoke (e.g., execute) callback function 480 at a particular time, based on a particular event, or the like. For example, as described elsewhere herein, a particular hook 460 associated with kernel 430 (e.g., network protocol stack 450) may include a function pointer that invokes a particular callback function 480 associated with loadable kernel module 470. In this case, the function pointer may include a pointer that points to executable code within memory, and is capable of invoking a function. For example, the function pointer may invoke a particular callback function 480 of loadable kernel module 470 and provide arguments to the particular callback function 480 (e.g., control information and/or payload information associated with a socket API call, as described elsewhere herein).

In some implementations, kernel 430 may include an API by which loadable kernel module 470 may register and/or de-register callback functions 480. In this case, registration of callback function 480 may refer to the process by which loadable kernel module 470 provides, via the API provided by kernel 430, information to kernel 430 that instructs kernel 430 to invoke callback function 480 at a particular time, based on occurrence of a particular event, or the like. As an example, the event may include kernel 430 executing a particular hook 460 associated with network protocol stack 450.

In this way, when the particular hook 460 of network protocol stack 450 is executed, kernel 430 may invoke a particular callback function 480 associated with loadable kernel module 470. Similarly, de-registration of callback function 480 may refer to the process by which loadable kernel module 470 provides information to kernel 430 that removes an instruction for kernel 430 to invoke callback function 480.

In this way, loadable kernel module 470 may register particular callback functions 480 to be invoked, thereby enabling extensibility and/or changes in functionality of kernel 430 without requiring modification to kernel 430 (e.g., addition of code to kernel 430).

As further shown in FIG. 5, process 500 may include receiving, by the kernel of the device and from an application of the device, a socket application programming interface (API) call (block 520). For example, kernel 430 may receive, from application 410, a socket API call associated with application 410.

In some implementations, application 410 may implement socket API calls to control and use sockets. In some implementations, the socket API call may include a call used to transmit information to another socket (e.g., sendmsg ( ), send ( ), sendto ( ), or the like), a call used to receive information from a socket (e.g., recvmsg ( ), recvfrom ( ), or the like), a call used to manipulate (e.g., retrieve, set, etc.) options associated with a socket (e.g., getsockopt ( ), setsockopt ( ), or the like), or another type of call. For example, manipulating an option may refer to retrieving information associated with a socket error, setting a buffer size for the socket, binding a port number to multiple sockets, setting a number of packets that may be queued for the socket, or the like.

Additionally, or alternatively, the socket API call may be associated with a particular networking protocol that corresponds to a type of network socket, such as a TCP socket, a UDP socket, a raw IP socket, or the like. While implementations herein may describe particular types of kernels (e.g., a Linux kernel), socket API calls (e.g., associated with Linux kernels), and/or particular networking protocols, other implementations may include other types of kernels, socket API calls, and/or networking protocols.

In some implementations, application 410 may provide, via socket library 420, a socket API call to kernel 430. In some implementations, the socket API call may include payload information (e.g., application data) and/or control information (e.g., cmsgs, such as ancillary data or metadata that may be used by network protocol stack 450 and/or application 410 when using sockets).

In some implementations, kernel 430 (e.g., socket layer 440) may receive the socket API call, and provide the socket API call to network protocol stack 450 (e.g., a protocol specific handler that processes socket API calls). For example, if the socket API call is associated with a TCP socket, then a TCP specific handler may receive and/or process the socket API call. In some implementations, network protocol stack 450 may allocate a socket buffer to store payload information associated with the socket API call (e.g., if the socket API call is a sendmsg( ) call).

As further shown in FIG. 5, process 500 may include executing, by the kernel of the device, the hook based on receiving the socket API call (block 530), and invoking, by the kernel of the device, the callback function associated with the loadable kernel module based on executing the hook to permit a functionality associated with the callback function to be provided (block 540). For example, kernel 430 may execute hook 460 based on the socket API call, and hook 460 may invoke callback function 480 associated with loadable kernel module 470 based on being executed.

In some implementations, network protocol stack 450 may be associated with hook 460. For example, hook 460 may include code that intercepts a socket API call that is received by network protocol stack 450. In some implementations, hook 460 may be associated with a function pointer that invokes callback function 480 associated with loadable kernel module 470.

In some implementations, network protocol stack 450 may be associated with a set of hooks 460. For example, a particular hook 460 may be associated with a protocol specific handler and/or a type of socket API call. As a specific example, a socket API call associated with transmitting packets via a TCP socket may be associated with a first hook 460, a socket API call associated with receiving packets via a TCP socket may be associated with a second hook 460, a socket API call associated with manipulating an option associated with a TCP socket may be associated with a third hook 460, or the like.

In some implementations, hook 460, when executed, may intercept the socket API call (e.g., prevent network protocol stack 450 from further processing the socket API call), invoke callback function 480 based on intercepting the socket API call, and provide information associated with the socket API call as an argument to callback function 480. As an example, assume that the socket API call is associated with transmitting packets via a UDP socket (e.g., a sendmsg ( ) socket API call). In this case, a UDP handler associated with processing sendmsg( ) socket API calls may receive the socket API call from socket layer 440. Additionally, in this case, the UDP handler may allocate a socket buffer to store payload information associated with the socket API call (e.g., application data that may be transmitted via the UDP socket). Additionally, the UDP handler may receive control information associated with the socket API call. Additionally, the UDP handler may execute a particular hook 460 associated with the UDP handler. In this case, the particular hook 460 may intercept the payload information and the control information, invoke a particular callback function 480 associated with loadable kernel module 470, and provide the payload information and/or control information as arguments to the particular callback function 480.

In some implementations, hook 460 may invoke multiple callback functions 480 associated with loadable kernel module 470. For example, loadable kernel module 470 may register multiple callback functions 480 to be invoked by kernel 430. In some implementations, hook 460 may invoke each callback function 480, of the callback functions 480, in parallel (e.g., callback functions 480 may execute in parallel). Alternatively, hook 460 may invoke callback functions 480 in a particular order or sequence. For example, hook 460 may invoke a first callback function 480, and receive information identifying an execution result of the first callback function 480. Continuing the example, hook 460 may invoke a second callback function 480 based on invoking the first callback function 480.

Continuing with the example described above, the particular callback function 480 may perform a particular functionality based on being executed, and provide an execution result to the UDP handler. For example, assume that the particular callback function 480 modifies the control information. In this case, the UDP handler may receive the modified control information, and process the socket API call based on the modified control information. Additionally, the UDP handler may provide the payload information to a UDP socket for transmission (e.g., based on the modified control information).

As another example, assume that the socket API call is associated with receiving information via a raw IP socket (e.g., a recvmsg ( ) socket API call). In this case, a raw IP handler may receive a recvmsg ( ) socket API call that indicates that application 410 is requesting packets, that arrive via a raw IP socket, to be provided to application 410. Continuing with the example, network device 210 may receive a packet via a socket, determine that the packet is an IP packet, and provide the packet to an IP handler associated with network protocol stack 450. In this case, the IP handler may determine that the packet is a raw IP packet, and may provide the packet to the raw IP handler.

Further, the raw IP handler may copy payload information from a socket buffer to an application buffer, and generate control information to provide to application 410. In this case, the raw IP handler may execute a particular hook 460 associated with the raw IP handler. The particular hook 460 may intercept the payload information and the control information (e.g., to prevent the payload information and the control information from being provided to application 410), invoke a particular callback function 480 associated with loadable kernel module 470, and provide the payload information and the control information as arguments to the particular callback function 480. The particular callback function 480 may perform a particular functionality (e.g., may inject additional control information, collect a statistic regarding the control information, modify the control information, or the like) based on being executed, and provide an execution result to the raw IP handler. The raw IP raw handler may provide the payload information and the modified control information to application 410 (e.g., via socket layer 440).

In this way, a functionality, associated with code of callback function 480, may be provided based on execution of callback function 480. As examples, callback function 480 may filter control information, modify the control information (e.g., to re-map interface indices, or the like), collect metrics and/or statistics based on the control information, or the like. In this way, implementations described herein enable extensibility of kernel 430 without requiring extensive modifications to code of kernel 430.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein enable control information to be intercepted via usage of loadable kernel modules. For example, a loadable kernel module may register a callback function with a kernel, which may cause the kernel to invoke the callback function based on occurrence of a particular event. The event may include execution of a hook associated with a protocol specific handler of the kernel (e.g., code that may process particular types of socket API calls associated with various transport layer protocols). In this way, the kernel may receive, from an application, a socket API call that includes control information, and invoke a callback function associated with the loadable kernel module based on the socket API call.

Additionally, the kernel may provide the control information as an argument to the callback function, thereby enabling a functionality, associated with the callback function, to be performed in association with the control information (e.g., filter the control information, collect the control information, modify the control information, add additional control information, or the like). Additionally, the callback function may provide an execution result to the kernel, thereby enabling the kernel to further process the socket API call (e.g., provide a packet to another socket based on the modified control information, provide a packet to the application, provide modified control information to the application, or the like).

In this way, implementations described herein enable extensibility to the kernel of the network device via loadable kernel modules rather than requiring modifications to underlying operating system network code. Additionally, implementations described herein enable interception of control information passed between an application and a kernel to support additional functionality provided via callback functions of a loadable kernel module.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive, by a kernel of the device and from a loadable kernel module of the device, information that instructs the kernel of the device to invoke a callback function associated with the loadable kernel module based on an execution of a hook of a transport layer protocol handler of the kernel of the device,
the kernel of the device being associated with a set of hooks,
the set of hooks including the hook, and
each hook, of the set of hooks, being associated with a particular transport layer protocol;
receive, by the kernel of the device and from an application of the device, a socket application programming interface (API) call,
the socket API call including control information;
receive, after receiving the socket API call, a packet via a socket,
the socket API call requesting the kernel of the device to provide the packet to the application;
execute, by the kernel of the device, the hook based on receiving the packet via the socket; and
invoke, by the kernel of the device, the callback function associated with the loadable kernel module based on executing the hook to permit a functionality associated with the callback function to be provided,
the kernel to provide the control information, associated with the socket API call, to the callback function as an argument.

2. The device of claim 1,
where the control information is first control information; and
where the one or more processors are further to:
provide, to the application of the device, second control information based on invoking the callback function,
the callback function to generate the second control information, and
the kernel to receive the second control information based on the callback function generating the second control information.

3. The device of claim 1,
where the one or more processors are further to:
receive, from the application of the device, payload information based on the socket API call; and
where the one or more processors, when invoking the callback function, are to:
invoke the callback function and provide the payload information as another argument to the callback function.

4. The device of claim 1, where the one or more processors are further to:
receive modified control information based on invoking the callback function; and
process the socket API call based on the modified control information.

5. The device of claim 1, where the hook is associated with a type of the socket API call.

6. The device of claim 1, where functionality associated with the callback function includes at least one of:
injecting additional control information in the socket API call, or
collecting a statistic regarding the control information in the socket API call.

7. The device of claim 1, where the kernel of the device is a Linux kernel.

8. A non-transitory computer-readable medium storing instructions, the instructions comprising:
one or more instructions that, when executed by one or more processors of a device, cause the one or more processors to:
receive, by a kernel of the device and from a loadable kernel module of the device, information that instructs the kernel of the device to invoke a callback function associated with the loadable kernel module based on an execution of a hook of a transport layer protocol handler of the kernel of the device,
the kernel of the device being associated with a set of hooks,
the set of hooks including the hook, and
each hook, of the set of hooks, being associated with a particular transport layer protocol;
receive, by the kernel of the device and from an application of the device, a socket application programming interface (API) call;
receive, after receiving the socket API call, a packet via a socket,
the socket API call requesting the kernel of the device to provide the packet to the application;
execute, by the kernel of the device, the hook based on receiving the packet via socket; and
invoke, by the kernel of the device, the callback function associated with the loadable kernel module based on executing the hook to permit a functionality associated with the callback function to be provided,
the kernel to provide control information, associated with the socket API call, to the callback function as an argument.

9. The non-transitory computer-readable medium of claim 8, where the one or more instructions, when executed by the one or more processors, further cause the one or more processors to:
provide, to the application of the device, modified control information,
the callback function to generate the modified control information based on the control information.

10. The non-transitory computer-readable medium of claim 8, where the one or more instructions, when executed by the one or more processors, further cause the one or more processors to:
receive, from the application, payload information based on the socket API call,
the socket API call being associated with transmitting the packet via the socket;
receive information that identifies an execution result of the callback function; and
provide, to another device, the packet, including the payload information, based on the information that identifies the execution result of the callback function.

11. The non-transitory computer-readable medium of claim 8, where the one or more instructions, when executed by the one or more processors, further cause the one or more processors to:
    receive modified control information based on invoking the callback function; and
    process the socket API call based on the modified control information.

12. The non-transitory computer-readable medium of claim 8, where each hook of the set of hooks is associated with a particular type of socket API call.

13. The non-transitory computer-readable medium of claim 8, where functionality associated with the callback function includes at least one of:
    injecting additional control information in the socket API call, or
    collecting a statistic regarding the control information in the socket API call.

14. The non-transitory computer-readable medium of claim 8, where the kernel of the device is a Linux kernel.

15. A method, comprising:
    receiving, by a kernel of a device and from a loadable kernel module of the device, information that instructs the kernel of the device to invoke a function associated with the loadable kernel module based on an execution of a hook of a transport layer protocol handler of the kernel of the device,
        the kernel of the device being associated with a set of hooks,
        the set of hooks including the hook, and
        each hook, of the set of hooks, being associated with a particular transport layer protocol;
    receiving, by the kernel of the device and from an application of the device, a socket application programming interface (API) call,
        the socket API call including control information;
    receiving, by the kernel of the device and after receiving the socket API call, a packet via a socket,
        the socket API call requesting the kernel of the device to provide the packet to the application;
    executing, by the kernel of the device, the hook based on based on receiving the socket; and
    invoking, by the kernel of the device, the function associated with the loadable kernel module based on executing the hook to permit a functionality associated with the function to be provided,
        the kernel to provide the control information, associated with the socket API call, to the function as an argument.

16. The method of claim 15, further comprising:
    providing, to the application of the device, modified control information based on invoking the function,
        the function to generate the modified control information, and
        the kernel to receive the modified control information based on the function generating the modified control information.

17. The method of claim 15, further comprising:
    receiving, from the application, payload information based on the socket API call; and
    where invoking the function comprises:
        invoking the function and providing the payload information as another argument to the function.

18. The method of claim 15, further comprising:
    receiving modified control information based on invoking the function; and
    processing the socket API call based on the modified control information,
        the device to provide, to another device, a packet based on processing the modified control information.

19. The method of claim 15, where functionality associated with the function includes at least one of:
    injecting additional control information in the socket API call, or
    collecting a statistic regarding the control information in the socket API call.

20. The method of claim 15, where the kernel of the device is a Linux kernel.

* * * * *